United States Patent
Smith

(10) Patent No.: US 7,085,968 B2
(45) Date of Patent: Aug. 1, 2006

(54) AUDIBLY ENABLED ERROR STATUS

(75) Inventor: Michael G. Smith, Tustin, CA (US)

(73) Assignee: Gateway Inc., Irvine, CA (US)

( * ) Notice: Subject to any disclaimer, the term of this patent is extended or adjusted under 35 U.S.C. 154(b) by 378 days.

(21) Appl. No.: 10/151,588

(22) Filed: May 20, 2002

(65) Prior Publication Data

US 2003/0217312 A1    Nov. 20, 2003

(51) Int. Cl.
G06F 11/00    (2006.01)

(52) U.S. Cl. .......................................... 714/57; 714/46

(58) Field of Classification Search ................ 714/31, 714/46, 57, 43, 44, 48
See application file for complete search history.

(56) References Cited

U.S. PATENT DOCUMENTS

| | | | | |
|---|---|---|---|---|
| 4,426,691 | A * | 1/1984 | Kawasaki | 369/21 |
| 5,502,496 | A | 3/1996 | Hailey, Sr. et al. | 348/462 |
| 5,526,212 | A * | 6/1996 | Drouin | 360/137 |
| 5,953,010 | A | 9/1999 | Kampe et al. | 345/348 |
| 6,111,562 | A | 8/2000 | Downs et al. | 345/145 |
| 6,138,253 | A | 10/2000 | Buzsaki | 714/48 |
| 6,145,101 | A * | 11/2000 | Pike | 714/46 |
| 6,192,490 | B1 * | 2/2001 | Gross | 714/47 |
| 6,249,826 | B1 | 6/2001 | Parry et al. | 710/19 |
| 6,269,460 | B1 * | 7/2001 | Snover | 714/48 |
| 6,493,656 | B1 * | 12/2002 | Houston et al. | 702/187 |
| 6,600,614 | B1 * | 7/2003 | Lenny et al. | 360/31 |
| 6,628,573 | B1 * | 9/2003 | Hasegawa et al. | 369/6 |
| 6,731,206 | B1 * | 5/2004 | Yang et al. | 340/500 |
| 6,781,607 | B1 * | 8/2004 | Benham | 715/744 |

OTHER PUBLICATIONS

Microsoft Press Computer Dictionary Third Edition, "WAV", Microsoft Press, 1997, p.505.*

* cited by examiner

Primary Examiner—Scott Baderman
Assistant Examiner—Gabriel Chu
(74) Attorney, Agent, or Firm—Jeffrey A. Proehl; Woods, Fuller, Shultz & Smith

(57) ABSTRACT

A disk drive system includes a control bus, a processor and a controller attached to the control bus. An error table and an audio signal table are in communication with the controller and processor. An audio output device is attached to the bus of the disk drive. The audio signal table outputs information to the audio output device to produce an audible output in response to the controller detecting a particular error in the error table. The audio output can be digital and may be directed to an interface with a computer system such as a SPDIF output. The audio output can also be converted to an analog signal and directed to a component on the motherboard of a computer system. The disk drive system can also include a software instruction set for changing the error status of an error message to the status associated with a compact disk.

18 Claims, 5 Drawing Sheets

| | | |
|---|---|---|
| 501 — ERROR 1 | AUDIO FILE 1 | — 511 |
| 502 — ERROR 2 | AUDIO FILE 2 | — 512 |
| ERROR 3 | AUDIO FILE 3 | |
| ERROR 4 | AUDIO FILE 4 | |
| ⋮ | ⋮ | |
| 509 — ERROR N | AUDIO FILE N | — 519 |

| | 511 | 512 | | |
|---|---|---|---|---|
| 501 — ERROR 1 | AUDIO FILE 1A | AUDIO FILE 1B | — 521 |
| 502 — ERROR 2 | AUDIO FILE 2A | AUDIO FILE 2B | — 522 |
| ERROR 3 | AUDIO FILE 3A | AUDIO FILE 3B | |
| ERROR 4 | AUDIO FILE 4A | AUDIO FILE 4B | |
| ⋮ | ⋮ | ⋮ | |
| 509 — ERROR N | AUDIO FILE NA | AUDIO FILE NB | — 529 |

AUDIBLY ENABLED ERROR STATUS

FIELD OF THE INVENTION

The present invention is related to computer error messages and, in particular, to an apparatus and method for presenting error messages to computer users.

BACKGROUND OF THE INVENTION

As computer systems have become more common in the workplace and in the home, there has become a need to make these computer systems even more user friendly to enable use of computers by all sorts of people. There is also a need to allow computer systems to be set up to meet a particular user's needs.

Currently, many users of computers are visually impaired. Some are totally impaired while others are partially impaired. The partially impaired may use monitors or separate systems that magnify the screen to allow them to read the contents of the screen. Whether totally impaired or partially visually impaired there is a need for some computer users to use alternate senses as they use the computer. Error messages from various devices and the computer system generally appear on the screen as a pop-up menu. Unlike most computer users, a visually impaired user may not realize that something "out of the norm" resulting in an error message has occurred. The visually impaired user may continue to work despite the fact that the error may halt all input to the computer. Thus, there is a need for an alternative error messaging system other than the system where error messages pop up on a computer screen.

Other computer users also may need an alternate to the system where error messages pop up on the computer screen. Some users of computers are technically challenged. Some people adapt rather easily to computer technology. Other people simply do not adapt or learn easily from a system that teaches using basically the visual sense. For example, some users can not figure out the most user-friendly, intuitive graphical user interface. They stare at the screen wondering what to do next. The next person, who may be a good visual learner, intuitively knows how to use the same user-friendly graphical user interface. One area of extreme frustration for even sophisticated users, much less the technically challenged users, is the area of error messages. Many times the error message seemingly has little relation to the problem. A simple example is the error message "nonsystem disk error." Most of the time this means the user had a floppy disk without a bootup program in the floppy drive bay. The fix for the error usually is to remove the floppy and press another key. The technically challenged user or one that is not a gifted visual learner that can not figure out the simplest graphical user interface generally will be extremely frustrated by an error message that pops up on the computer screen. Thus, there is also a need for an alternative to pop-up error messages for those that are not good visual learners or for the technically challenged users.

Therefore, there is a need for apparatus and method for providing an alternate output to error messages which merely pop-up on the screen of a computer monitor.

SUMMARY OF THE INVENTION

A disk drive system includes a control bus, a processor, and a controller attached to the control bus. An error table and an audio signal table are in communication with the controller and processor. An audio output device is attached to the bus of the disk drive. The audio signal table outputs information to the audio output device to produce an audible output in response to the controller detecting a particular error in the error table. The audio output can be digital and may be directed to an interface with a computer system such as a SPDIF output. The audio output can also be converted to an analog signal and directed to a component on the motherboard of a computer system. The disk drive system can also include a software instruction set for changing the error status of an error message to the status associated with a compact disk.

A disk drive system includes an internal control bus, a controller attached to the internal control bus. Also in communication with the internal control bus is a processor and an error table and an audio table. An audio output device is attached to the control bus. The processor outputs a digital signal to produce an audible output in response to the controller detecting a particular error on the error table. In some embodiments, the audible output is generated with a digital to analog converter. The digital to analog converter can be connected to the processor and controller via the internal control bus. In other embodiments, the audible output is transferred digitally via an ATAPI interface. In still other embodiments, the audible output is transferred serially by a SPDIF output. The audio table includes a plurality of audible outputs stored in a digital form related to a selected error message. In some embodiments, the audio table includes a plurality of audible outputs related to a selected error. The different messages related to the selected error are directed toward users at different user levels. The user selects a particular user level of the different user levels. In another embodiment, a plurality of audible outputs are related to a selected error. In this embodiment, the different messages related to the selected error are successively output in response to the same error message. In an embodiment where the disk drive is an optical disk drive, the disk drive system includes a software instruction set for changing the status of an error message to an audio CD status and provides the error message as if providing a digital audio file. In some embodiments of the disk drive system, the audio output from the disk drive is a digital signal. The disk drive system can also include a control memory attached to the internal control bus. The audio output table is stored in the control memory. The error table can also be stored in the control memory. The audio output table can include wav files. In one embodiment, the audio output table and the error table are combined.

Also disclosed is a method for indicating an error on a disk drive which includes detecting an error, and outputting a digital signal from the disk drive. The digital signal includes information related to the error. In some embodiments, outputting a digital signal further includes outputting different digital signals for different detected errors. In another embodiment, outputting an audible signal further comprises outputting different audible messages for the same detected errors. The different audible messages for a selected detected error are related to a selected user level input.

Also disclosed is a data structure stored in a machine-readable medium within an optical disk drive. The data structure is for audibly indicating an error. The data structure includes an error indication state, and a table of audible signals related to selected errors.

BRIEF DESCRIPTION OF THE DRAWINGS

FIG. 5 is a depiction of one embodiment of an audio table of this invention.

FIG. 6 is a depiction of another embodiment of an audio table of this invention.

DESCRIPTION OF THE EMBODIMENTS

In the following detailed description of the embodiments, reference is made to G11 the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
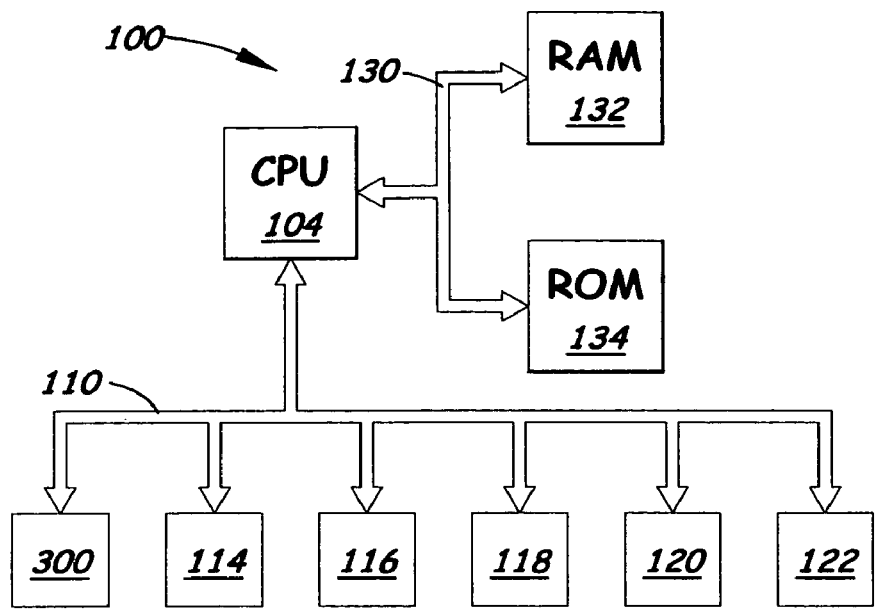
FIG. 1 is a block diagram of a computer system 100 according to the present invention.

FIG. 1 is a generalized schematic view of a computer system 100. The computer system 100 may also be called an electronic system or an information handling system. The information handling system or computer system 100 includes a central processing unit 104, a random access memory 132, and a system bus 130 for communicatively coupling the central processing unit 104 and the random access memory 132. The information handling system 100 also includes an input/output bus 110 and several devices peripheral devices, such as 112, 114, 116, 118, 120, and 122 may be attached to the input output bus 110. A disc drive device, such as optical drive 300, which includes the audibly enabled error status system further detailed below, is connected to the input output bus 110. Other peripheral devices can be attached to the input output bus 110. Other such devices include hard disc drives, magneto optical drives, floppy disc drives, monitors, keyboards and other such peripherals. It should be noted that any type of disc drive could use the method and apparatus for playing audible error status described below.

Figure 2:
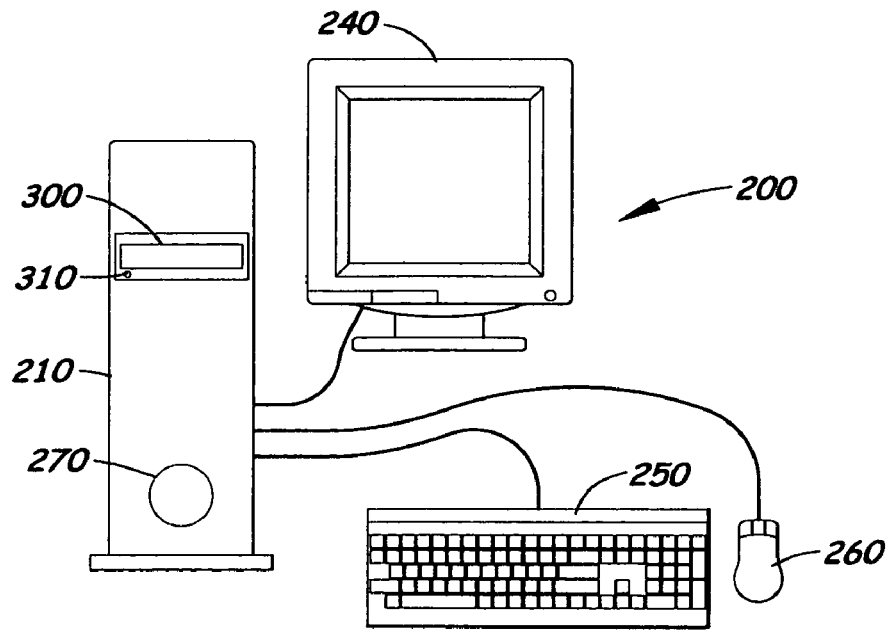
FIG. 2 is a perspective view of a computer system.

FIG. 2 is a perspective view of a personal computer system 200 and generally shows a view of the components as seen by a user. The components of FIG. 2 will be discussed with respect to both FIGS. 1 and 2. The personal computer 200 comprises a tower, or desk unit 210 having a peripheral device, such as optical disk drive 300, attached to the input output bus 110 of the computer system. The optical disk drive 300 shown in FIG. 2 is within a frame 302 and includes an output socket 310. Again, the disk drive that includes the audibly enabled error status system described below is not limited to an optical disk drive. Other disk drives that could use the audibly enabled error status system include all types of optical drives, hard disk drives, floppy disk drives, CD drives, DVD drives and other types of data storage devices, such as tape drives.

The computer 200 further includes a monitor or display 240 which is a standard CRT device in one embodiment, plasma display, flat panel, active matrix or other type of display device. The monitor or display is attached to the VGA port 129. A cursor control device such as a keyboard 250 having a plurality of keys, is also attached to the computer. In some embodiments, the keyboard is coupled to the tower 110 by a USB (Universal Serial Bus) connection 126.

In one embodiment, the cursor control device 260 is a mouse, trackball or touch pad and has a housing and a cursor input device. In some embodiments, a personal computer system will have a cursor control device that includes both a keyboard and a mouse, trackball or touch pad. The cursor input device is suitable for providing an output indicating movement of a cursor to an information handling system, such as a personal computer. A key disposed on the housing is suitable for enabling a user to select a cursor position.

The computer system 200 also includes a device for producing an audio output, such as a speaker 270. The speaker 270 can be internal to the tower or desk unit 210 or the speaker 270 can be a separate set of speakers positioned outside the enclosure of the tower or desk unit 210.

Figure 3:
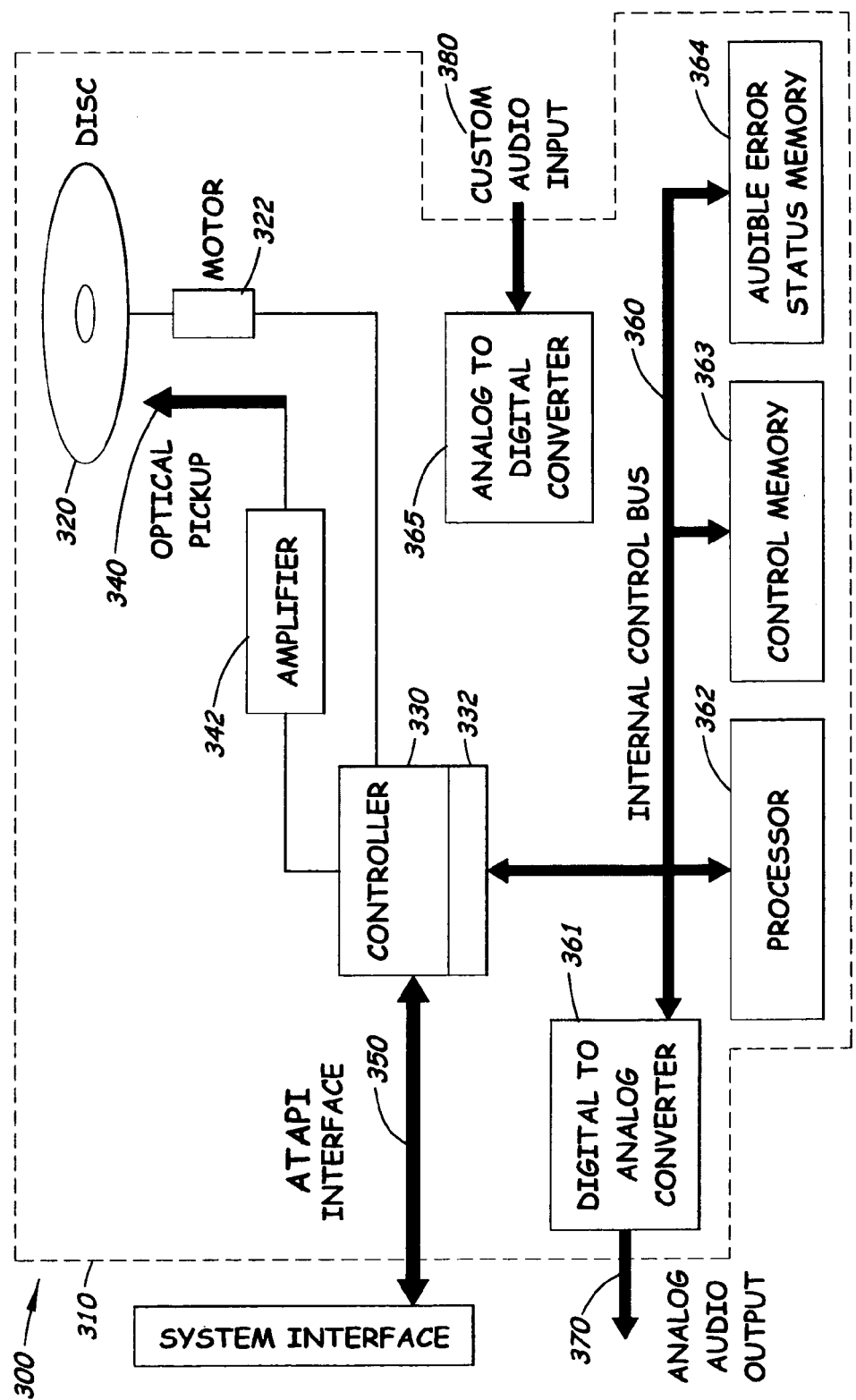
FIG. 3 is a general block diagram of an embodiment of a optical disk drive according to this invention.

FIG. 3 is a general block diagram of an embodiment of a optical disk drive 300 according to this invention. The optical disk drive 300 includes a housing 310 which is depicted by the dotted line carrying the reference numeral 310 in FIG. 3. The optical drive 300 includes a disk 320 which is turned by a disk drive motor 322. The optical disk drive includes a controller 330 which controls many of the operations of the optical disk drive 300. For example, the controller generally controls the speed of rotation of the disk drive motor 322 using a feedback control loop (not shown). The disk drive also includes an optical transducer or pickup 340 which reads representations of data such as audio files or other data from the optical disk. The signals generated are amplified by an amplifier 342 before being input to the controller 330. The controller also controls an ATAPI interface 350. The ATAPI interface is also comparable to an IDE interface. The ATAPI interface 350 connects to a computer system such as computer system 100 (shown in FIG. 1). As mentioned in the description of FIG. 1, the optical drive 300 can be attached to an input/output bus 110 of the computer system 100. The optical drive 300 also includes an internal control bus 360. Attached to the internal control bus 360 is the controller 330 as well as a digital-to-analog converter 361, a processor 362, a control memory 363 and an audible error status memory 364. Also attached to the internal control bus 360 is an analog-to-digital converter 365. The controller 330 includes a status registry 332 which includes both error conditions or types as well as a map to specific error messages. The control memory includes a set of software instructions used to instruct the processor, controller and the optical drive 300 to play error messages through various channels as though the error message was a CD or other digital audio file.

In a first embodiment, an error condition or type is received by the controller. An error message associated with the particular condition or type of error is identified and the controller retrieves a particular error or status message from the audible error status memory 364. The error retrieved from the audible error status memory 364 is then transferred over the internal control bus 360 to the digital-to-analog converter 361. The error message is then converted from digital-to-analog output 370. The output 370 is typically connected to the computer system through a cable which is attached from the digital-to-analog converter to the motherboard of a computer system 100, 200. The motherboard then routes the message directly to an analog audio output having left and right channel. Alternately, the analog audio cable may attach directly to an audio subsystem such as a sound card.

The method discussed with respect to the first embodiment assumes that there are no changes to the operating system or the system hardware of the computer 100, 200. The status register of the peripheral device such as the status register of the optical disk drive, does not indicate that there is an error, but rather the software issues a media status change. In response to the media status change, the operating system interrogates the peripheral and the status change indicates an audio CD has been put into the system and then transfers the digital error information across the ATAPI interface. The digital audio error information conforms to red book audio format. Red book audio format is a standard that defines digital audio format for compact disks.

In the first embodiment, the error status can be provided in varying levels of detail. The levels can be assigned by user ability, language or customizable by the user. The customized version allows the user to record the peripheral or write a digitally encoded file to the peripherals for specific error conditions. The custom audio input 380 is input to an analog-to-digital converter 365 for converting the analog input to a digital file. The digital file form is placed in the audible error status memory 364 for future use by the processor 362 and controller 330 when a specific error is to be output in response to a specific error condition or error type.

The optical disk drive 300 also includes a custom audio input 380. The custom audio input inputs an analog signal or message into the analog-to-digital converter 365. At the analog-to-digital converter 365, the analog message is converted to a digital message and then this message may be stored by the controller 330 in the audible error status memory 364, as a custom message which can be called up for a very specific error condition or error type and played or passed to a computer system over the digital-to-analog converter 361 to output 370 to an analog audio output.

In a second embodiment, an error is received by the controller 330 and the specific error type or error condition is identified using the status register 332. A specific error message is then determined and fetched from the audible error status memory 364. The processor 362 places a digital version of the error onto the internal control bus and routes it to the controller 330. The controller 330, in turn, places the digital error message over the ATAPI interface 350 to the system interface associated with the computer system 100, 200. Of course, the processor uses a software instruction set that indicates the error message retrieved from the audible error status memory 364 is to be played as though it were an audio file or other file from the disk 320 of the optical disk drive 300. Advantageously, in the second embodiment, the error status is essentially enabled digitally. In other words, the error status need not be converted from a digital file to an analog signal before being sent to a computer system 100, 200 over the ATAPI interface 350. When the error message is sent over the ATAPI interface, the operating system associated with the computer 100, 200 and various drivers that work with the operating system, convert the digital error condition message to analog on the motherboard of the system and then output the audio message to an audio subsystem. Operating systems such as Windows 98, Windows 2000, Windows ME and Windows XP, support the transfer of audio files over the ATAPI interface directly to the motherboard of the computer system 100, 200 via the system interface.

The optical disk drive 300 also includes a custom audio input 380. The custom audio input inputs an analog signal or message into the analog-to-digital converter 365. At the analog-to-digital converter 365, the analog message is converted to a digital message and then this message may be stored by the processor 362 in the audible error status memory 364, as a custom message which can be called up for a very specific error condition or error type and played or passed to a computer system over the ATAPI interface.

In the second embodiment, the error status can be provided in varying levels of detail. The levels can be assigned by user ability, language or customizable by the user. The customized version allows the user to record the peripheral or write a digitally encoded file to the peripherals for specific error conditions. The custom audio input 380 is input to an analog-to-digital converter 365 for converting the analog input to a digital file. The digital file form is placed in the audible error status memory 364 for future use by the processor 362 and controller 330 when a specific error is to be output in response to a specific error condition or error type.

Figure 4:
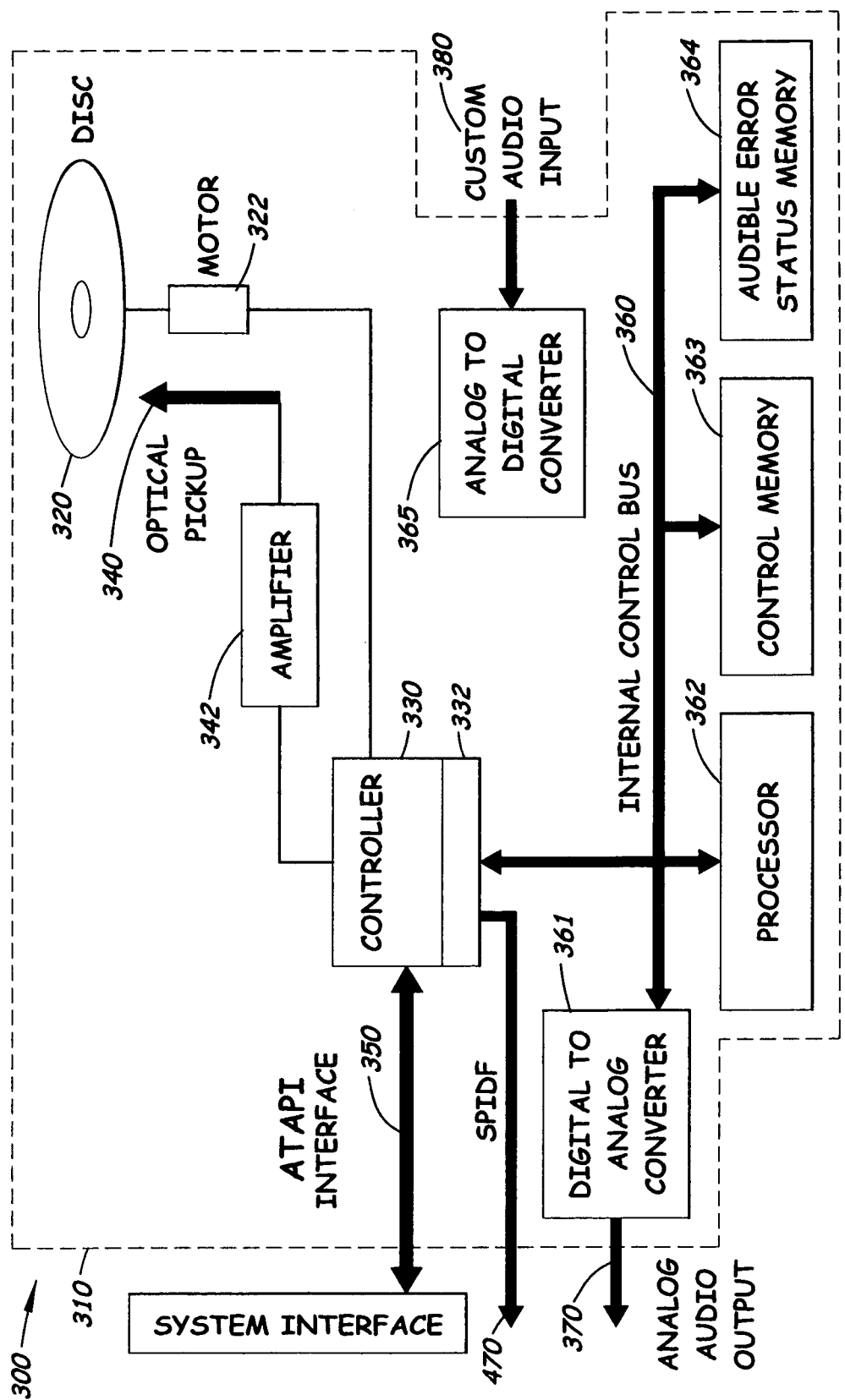
FIG. 4 is a general block diagram of another embodiment of a optical disk drive according to this invention.

A third embodiment of the optical disk drive 300 is shown in FIG. 4. FIG. 4 is a general block diagram of the optical disk drive 300 according to this invention. FIG. 4 is essentially the same as FIG. 3, however, in addition to the output 370 and the ATAPI interface 350, there is an additional output 470. The additional output is a Sony Phillips digital interface ("SPDIF"). The interface 470 is a serial digital output. In this particular embodiment, the controller 330 receives an error condition or error type and checks with the status register 332 to determine the error message that must be played for the particular error condition or error type. The processor then fetches the particular error message from the audible error status memory 364 and places it on the internal control bus for receipt by the controller 330. The controller then routes the fetched audible error status memory and outputs the audible error status directly to the digital output or SPDIF 470. Thus, the controller is again able to pass a digital, audible error status message from the audible error status memory 364 through the SPDIF output 470. The SPDIF output would typically be attached to a digital audio system. Most computer systems do not have a SPDIF digital audio connection, but this is widely used in consumer electronics. Thus, the optical drive 300 that is equipped with the SPDIF output 470, as well as the digital-to-analog converter 360 and its output 370, as well as an ATAPI interface, could be used both for consumer electronics as well as in computers.

The system uses an extended status register to show that the audible error status conforms to audibly enabled error status devices. After the extended error status has been received, the system issues a play audible error status. The optical drive 300 then transfers the audible error status data to the audio subsystem. The data provided over the SPDIF output is compliant to red book audio which is a CD disk standard.

The error status can be provided in varying levels of detail. The levels can be assigned by user ability, language or customizable by the user. The customized version allows the user to record the peripheral or write a digitally encoded file to the peripherals for specific error conditions. The custom audio input 380 is input to an analog-to-digital converter 365 for converting the analog input to a digital file. The digital file form is placed in the audible error status memory 364 for future use by the processor 362 and controller 330 when a specific error is to be output in response to a specific error condition or error type.

Figure 7:
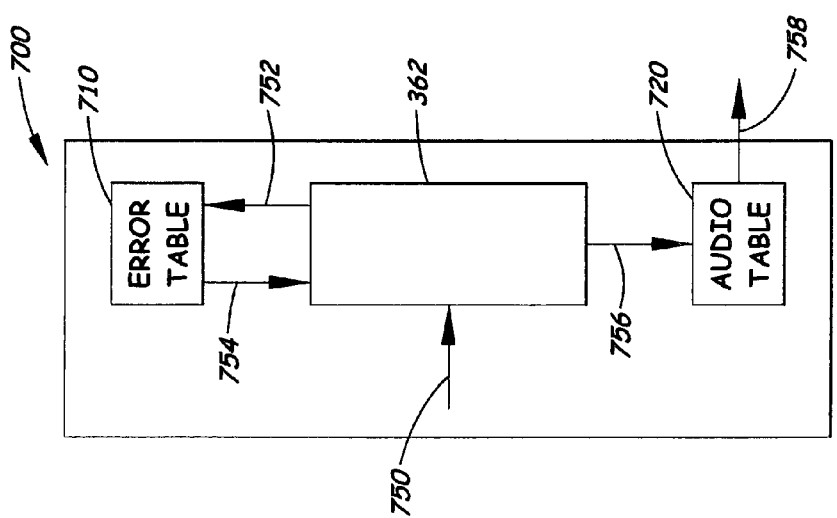
FIG. 7 is a block diagram of another embodiment of a processor, error table and audio

FIG. 7 is a general block diagram of the processor 362 attached to the internal control bus 360 (shown in FIGS. 3 and 4). Attached to the processor 362 is an error table 710 and an audio table 720. In operation, the processor 362 either detects or receives a signal from components associated with the disk drive indicating that there is an error, as depicted by signal line 750. Upon detection of an error, the processor 362 passes the signal to the error table 710, as depicted by signal 752. In the error table, the specific error is identified and an error message is forwarded back to the processor 362, as depicted by signal line 754. The processor 362 uses information from the error table 710 to retrieve information from the audio table 720, as depicted by signal line 756. The audio table 720 includes a series of audio files. Each of the audio files is associated with a particular error. The processor 362 selects the appropriate audio file from the audio table 720 and forwards it to either a digital to analog convertor 361 (first embodiment), directly to the ATAPI interface 370 (second embodiment), or to the SPDIF output 470 (third embodiment) as depicted by signal line 758. It should be noted that the system may also forward the specific input from the error table 754 to the monitor 240 of the computer system to which the optical drive is attached to provide a visual representation of the error status.

FIG. 5 is a depiction of one embodiment of an audio file 500 that is positioned or communicatively coupled to the audio table 720. As shown in FIG. 5, there are N possible errors. For example, error 1 which carries the reference numeral 501 and error 2 which carries the reference 502 and error N which carries the reference 509, all occur in a first column on the audio table 500. Associated with error 1, 501, is an audio file 511. Associated with error 2 is an audio file 512 and associated with error N is an audio file 509. In essence, for each error signal produced, there is a related audio file. The audio file can merely be an audio file which corresponds exactly to the error message. For example, audio file 1 may be a WAV file that exactly mimics or repeats in audible speech the exact text of error message 1. In other embodiments, audio file 511 may include a spoken text which is different than the error message. This is especially helpful if the users are technically challenged by the normal content of an error message, such as error 501.

FIG. 6 is a depiction of another embodiment of an audio table 600. In this particular audio table, there are N possible error messages depicted by reference numerals 501, 502, 509. In the audio table 600, there are a plurality of audio files associated with each, or at least several, of the error messages. For example, error message 1, 501, includes an audio file 511 and an audio file 521. Error message 2 carrying a reference numeral 502 has an audio file 512 and an audio file 522 associated therewith. Similarly, error message 509 has audio file 519 and audio file 529 associated therewith. A plurality of audio files associated with a single error message could be used in several different ways. For example, a first set of audio files such as 511, 512, 519 could be set for a sophisticated user and a second set of audio files 521, 522, 529 could be set for the technically challenged computer user. Of course, even though the audio table 600 shows only two audio files being associated with each error message, it should be noted that it is contemplated as within the scope of the invention that more audio files could be associated with each error message, thereby giving further division of levels of user, for example. Another possible way to use a plurality of audio files associated with a single error message is to have the audio files be used successively. For example, for a particular error message 1, the audio file 511 might be first played and if not N, if not understood, the audio file 521 could then be played. There also might be a successive series of directions located in the audio files for effectuating a fix to the particular error message. Yet another embodiment that is contemplated is that an error table need not have a fixed number of audio files associated with a particular error. For example, error 1 might have two audio files while error 4 might have one audio file associated with it, and while error N might have 16 audio files associated with that particular error. It is also contemplated that the error table could contain a map to certain universal audio files. For example, when none of the audio files associated with an error can be used to effectuate a fix, there might be a universal audio file associated with each of the errors that says take this problem to a tech support center or call a tech support line or return the computing system to the store. These error tables can be found in any type of memory including a hard disk drive, a floppy drive, a CD-ROM or a CD-DVD or any other type of memory.

Figure 8:
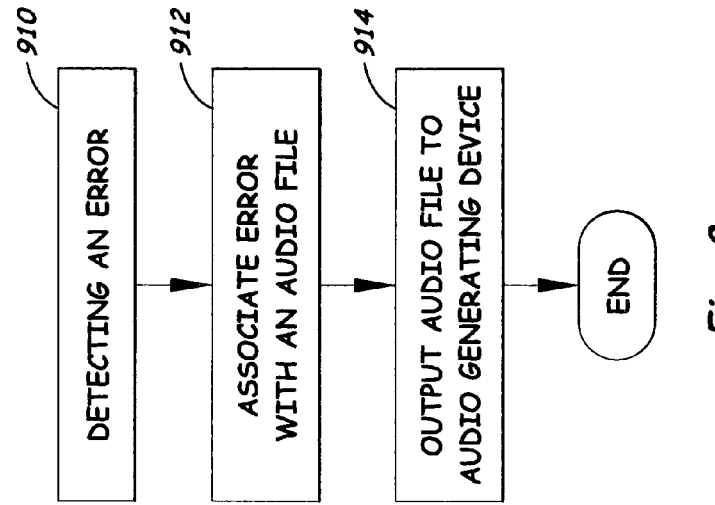
FIG. 8 is a flow diagram of a method of indicating an error in a computer system.

FIG. 8 is a flow diagram of the method of indicating an error in a computer system. The initial step is to detect an error, as depicted by reference numeral 910. It should be noted that the error that is detected can either be on the system board, in software or associated with a disk drive system, such as the optical disk drive. The next step is to associate the error with an audio file, as depicted by reference numeral 912. This is typically done in an audio table such as the audio table 720 shown in FIGS. 7 and 8 and audio tables 500 and 600 shown in FIGS. 5 and 6, respectively. Finally, the audio file is output to the audio-generating device, as depicted by reference numeral 914. The audio-generating device can be a sound card or a direct output to another device capable of converting the output to an audio output.

CONCLUSION

A disk drive system includes an internal control bus, a processor and controller attached to the internal control bus. Also in communication with the internal control bus is an error table and an audio table. An audio output device is attached to the control bus. The processor outputs a digital signal to produce an audible output in response to the controller detecting a particular error on the error table. In some embodiments, the audible output is generated with a digital to analog converter. The digital to analog converter can be connected to the processor and controller via the internal control bus. In other embodiments, the audible output is transferred digitally via an ATAPI interface. In still other embodiments, the audible output is transferred serially by a SPDIF output. The audio table includes a plurality of audible outputs stored in a digital form related to a selected error message. In some embodiments, the audio table includes a plurality of audible outputs related to a selected error. The different messages related to the selected error are directed toward users at different user levels. The user selects a particular user level of the different user levels. In another embodiment, a plurality of audible outputs are related to a selected error. In this embodiment, the different messages related to the selected error are successively output in response to the same error message. In an embodiment where the disk drive is an optical disk drive, the disk drive system includes a software instruction set for changing the status of an error message to an audio CD status and provides the error message as if providing a digital audio file. In some embodiments of the disk drive system, the audio output from the disk drive is a digital signal. The disk drive system can also include a control memory attached to the internal control bus. The audio output table is stored in the control memory. The error table can also be stored in the control memory. The audio output table can include wav files. In one embodiment, the audio output table and the error table are combined.

Another aspect of this invention includes a method for indicating an error on a disk drive which includes detecting an error, and outputting a digital signal from the disk drive. The digital signal includes information related to the error. In some embodiments, outputting a digital signal further includes outputting different digital signals for different detected errors. In another embodiment, outputting an audible signal further comprises outputting different audible messages for the same detected errors. The different audible messages for a selected detected error are related to a selected user level input.

Yet another aspect of this invention is a data structure stored in a machine-readable medium within an optical disk drive. The data structure is for audibly indicating an error. The data structure includes an error indication state, and a table of audible signals related to selected errors.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disk drive system comprising:
   an internal control bus;
   a processor attached to the internal control bus;
   an error table in communication with the internal control bus;
   an audio table in communication with the internal control bus;
   an audio output device attached to the internal control bus, the processor outputting a digital audio file from the audio table signal to produce an audible output in response to the processor detecting a particular error on the error table; and
   a controller attached to the internal control bus, wherein the audible output device is an ATAPI interface attached to the controller.

2. The disk drive system of claim 1 wherein the audio output device is a digital to analog converter.

3. The disk drive system of claim 2 further comprising a controller attached to the internal control bus, wherein the digital to analog converter is connected to the controller via the internal control bus.

4. The disk drive system of claim 1 wherein the audio table includes a plurality of audible outputs related to a selected error message.

5. The disk drive system of claim 1 wherein the audio table includes a plurality of audible outputs related to a selected error, wherein different messages related to the selected error are directed toward users at different user levels.

6. The disk drive system of claim 5 wherein the user selects a particular user level of the different user levels.

7. The disk drive system of claim 1 wherein the audio table includes a plurality of audible outputs related to a selected error, wherein different messages related to the selected error are successively output in response to the same error message.

8. The disk drive system of claim 1 wherein the audio output from the disk drive system is a digital signal.

9. The disk drive system of claim 8 wherein the error table is stored in an audible error status memory.

10. The disk drive system of claim 1 wherein the audio output table includes way files.

11. The disk drive system of claim 1 wherein the audio output table and the error table are combined.

12. A disk drive system comprising:
    an internal control bus;
    a processor attached to the internal control bus;
    an error table in communication with the internal control bus;
    an audio table in communication with the internal control bus; and
    an audio output device attached to the internal control bus, the processor outputting a digital audio file from the audio table signal to produce an audible output in response to the processor detecting a particular error on the error table;
    wherein the audible output device is an SPDIF serial digital output.

13. A disk drive system comprising:
    an internal control bus;
    a processor attached to the internal control bus;
    an error table in communication with the internal control bus;
    an audio table in communication with the internal control bus; and
    an audio output device attached to the internal control bus, the processor outputting a digital audio file from the audio table signal to produce an audible output in response to the processor detecting a particular error on the error table;
    wherein the disk drive is an optical disk drive, the system further comprising a software instruction set for indicating that an error message has an audio CD status.

14. The disk drive system of claim 13 further comprising a control memory attached to the internal control bus, wherein the software instruction set is stored in the control memory.

15. A method for indicating an error on a disk drive comprising:
    providing a disk drive comprising:
      an internal control bus;
      a processor attached to the internal control bus;
      an error table in communication with the internal control bus;
      an audio table in communication with the internal control bus;
      an audio output device attached to the internal control bus, the processor outputting a digital audio file from the audio table signal to produce an audible output in response to the processor detecting a particular error on the error table; and
      a controller attached to the internal control bus, wherein the audible output device is an ATAPI interface attached to the controller;
    detecting an error; and
    outputting a digital signal from the disk drive, the digital signal including information related to the error, the information including a digital audio file.

16. The method of claim 15 wherein outputting a digital signal further comprises outputting different digital signals for different detected errors.

17. A method for indicating an error on a disk drive comprising:
providing a disk drive comprising:
an internal control bus;
a processor attached to the internal control bus;
an error table in communication with the internal control bus;
an audio table in communication with the internal control bus;
an audio output device attached to the internal control bus, the processor outputting a digital audio file from the audio table signal to produce an audible output in response to the processor detecting a particular error on the error table; and
a controller attached to the internal control bus, wherein the audible output device is an ATAPI interface attached to the controller;
detecting an error; and
outputting a digital signal from the disk drive, the digital signal including information related to the error;
wherein outputting the digital signal further comprises outputting different audible messages for different detected errors.

18. A method for indicating an error on a disk drive comprising:
providing a disk drive comprising:
an internal control bus;
a processor attached to the internal control bus;
an error table in communication with the internal control bus;
an audio table in communication with the internal control bus;
an audio output device attached to the internal control bus, the processor outputting a digital audio file from the audio table signal to produce an audible output in response to the processor detecting a particular error on the error table; and
a controller attached to the internal control bus, wherein the audible output device is an ATAPI interface attached to the controller;
detecting an error; and
outputting a digital signal from the disk drive, the digital signal including information related to the error;
wherein outputting the digital signal further comprises outputting different audible messages for a selected detected error, the different audible messages related to a selected user level input.

* * * * *